(12) United States Patent
Lister (10) Patent No.: US 10,190,645 B2
(45) Date of Patent: Jan. 29, 2019

(54) HYDRAULIC CIRCUIT FOR CLUTCH ACTUATION

(71) Applicant: Caterpillar Inc., Peoria, IL (US)

(72) Inventor: Brian E. Lister, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 396 days.

(21) Appl. No.: 14/948,980

(22) Filed: Nov. 23, 2015

(65) Prior Publication Data

US 2017/0146075 A1    May 25, 2017

(51) Int. Cl.
    *F16D 25/12*    (2006.01)
    *F16D 48/02*    (2006.01)
    *F16D 25/06*    (2006.01)

(52) U.S. Cl.
    CPC .............. *F16D 25/14* (2013.01); *F16D 25/06* (2013.01)

(58) Field of Classification Search
    CPC .......... F16D 25/10; F16D 25/14; F16D 25/06; F16D 48/0206; F16D 2048/0209; F16D 2048/0215; F16D 2048/0221; F16D 2048/0257; F16D 2048/0263; F16D 2048/0266; F16D 2048/0275; F16D 2048/0281; F16D 25/12
    See application file for complete search history.

(56) References Cited

U.S. PATENT DOCUMENTS

| | | | |
|---|---|---|---|
| 3,596,564 A | 8/1971 | Johnson | |
| 5,067,603 A | 11/1991 | Kato et al. | |
| 6,450,309 B1 * | 9/2002 | Hirai | B60K 23/02 192/3.63 |
| 6,640,950 B2 | 11/2003 | Harvey et al. | |
| 6,843,755 B2 | 1/2005 | Estebanez et al. | |
| 7,353,725 B2 | 4/2008 | Kabrich et al. | |
| 7,578,376 B2 | 8/2009 | Borgerson et al. | |
| 8,340,879 B2 | 12/2012 | Glatthaar et al. | |
| 8,364,361 B2 | 1/2013 | Olson et al. | |
| 8,746,430 B2 | 6/2014 | Krauss et al. | |
| 8,950,561 B2 | 2/2015 | Lister et al. | |

(Continued)

FOREIGN PATENT DOCUMENTS

| | | |
|---|---|---|
| EP | 2053263 A2 | 4/2009 |
| WO | WO 03/019025 A1 | 3/2003 |

*Primary Examiner* — Huan Le
*Assistant Examiner* — Lori Wu
(74) *Attorney, Agent, or Firm* — Leydig, Voit & Mayer, LTD.

(57) ABSTRACT

A hydraulic circuit includes a clutch actuator operatively associated with a clutch that may be disposed in a transmission. A hydraulic fluid source supplies pressurized hydraulic fluid for the clutch actuator. To measure the filling rate of the hydraulic actuator, a reference actuator having a predetermined filling rate is disposed in parallel with the hydraulic actuator and in fluid communication with the hydraulic fluid source. If hydraulic pressure associated with the reference actuator does not correspond to the hydraulic pressure associated with the clutch actuator, a compensation valve can appropriately respond by selectively directing hydraulic fluid to or from the clutch actuator. In a further embodiment, the reference actuator and compensation valve may be replaced with an electrohydraulic valve utilizing feedback from the hydraulic pressure present at the inlet of the clutch actuator.

12 Claims, 4 Drawing Sheets

(56) References Cited

U.S. PATENT DOCUMENTS

| | | | |
|---|---|---|---|
| 2002/0119864 A1* | 8/2002 | Harries | F16H 61/2807 |
| | | | 477/79 |
| 2013/0228411 A1 | 9/2013 | Wesley et al. | |
| 2014/0048377 A1* | 2/2014 | Benson | F16D 25/00 |
| | | | 192/85.63 |
| 2015/0198241 A1 | 7/2015 | Barngrover et al. | |
| 2015/0198242 A1 | 7/2015 | Knox | |

* cited by examiner

HYDRAULIC CIRCUIT FOR CLUTCH ACTUATION

TECHNICAL FIELD

This patent disclosure relates generally to a work machine equipped with one or more clutches for coupling and decoupling rotating elements for power transmission and, more particularly, to a hydraulic circuit and method for engaging and disengaging the clutches.

BACKGROUND

In various types of work machines, in order to transmit power in the form of rotational motion generated by a prime mover such as an internal combustion engine to a driven element, which may be a rotatable wheel or other propulsion device associated with the machine, a powertrain operatively links the engine and driven element. The powertrain itself may include components such as a transmission to adjust and change the torque and/or speed characteristics of the transmitted power output. Transmissions include a plurality of gears that can be selectively engaged in different ratios to increase or decrease the rotational speed and, in an inverse relation, the torque transmitted through the powertrain. The gear ratios may include a forward-neutral-reverse gear as well as a plurality of fixed gear ratios that provide different ranges of speed and torque for the machine. Transmissions may be manual or automatic depending on the level of operator control over the selective shifting between gear ratios.

To switch between gear ratios, some transmissions utilize a hydraulic circuit configured to selectively operate clutches that are associated with the various gears. A standard clutch is a mechanical device in which adjacent rotatable elements coupled to different parts of the powertrain are moved into frictional engagement so that their relative rotational speeds synchronize with each other. In particular, when shifting between gear ratios, an "oncoming clutch" may engage a first pair of gears while an "off-going" clutch may disengage a second pair of gears. The driven gear associated with the oncoming clutch speeds up or down to match the speed of the driving gear. This engagement and disengagement of gears occurs simultaneously to continue power transfer through the transmission without interruption while the transmission attempts to smoothly change the speed and torque ratios. The hydraulic circuit directs hydraulic fluid to and from the oncoming and off-going clutches to move the elements into and out of frictional engagement.

Transmissions are sometimes calibrated to accommodate the initial speed difference between engaging gears and the inherent time delay in filling and draining hydraulic fluid from the oncoming and off-going clutches. Still, some degree of disruption often occurs during gear shifts, part of which may be caused by improper hydraulic engagement of the clutches. For example, if the oncoming clutch experiences an early fill event, filling too quickly with hydraulic fluid, the transmitted torque may suddenly spike causing the machine to jerk or lurch. Likewise, if the oncoming clutch experiences a late fill event such that the oncoming clutch is unable accepted the full torque transmission before the off-going clutch disengages, the machine may lug or temporarily drag before full torque transmission is restored. Besides being unpleasant for the operator of the machine, the jarring motions may dislodge or spill a load being carried by the machine. The jarring also subjects the components of the transmission to excessive wear and friction.

Machine manufacturers have developed various systems and methodologies to reduce or mitigate the effects of disrupted gear shifts. For example, U.S. Pat. No. 6,640,950 ("the '950 patent"), assigned to the assignee of the present disclosure, describes a method of engaging a clutch associated with a gear by directing hydraulic fluid to the clutch. A control system monitors the hydraulic pressure of the hydraulic fluid flowing to the clutch to determine when the clutch fills with fluid. The control system can thereafter operate the hydraulic circuit in various ways to gradually and smoothly move the rotatable elements of the clutch into full engagement. The present disclosure is directed to similar considerations regarding clutch engagement in a machine.

SUMMARY

The disclosure describes, in one aspect, a hydraulic circuit for a transmission in a work machine that utilizes hydraulic clutches to engage and disengage gears. The hydraulic circuit includes a hydraulic fluid source supplying pressurized hydraulic fluid to a clutch actuator operatively associated with the clutch. The clutch actuator can be a hydraulic cylinder including an actuator chamber and an actuator piston movably disposed in the actuator chamber. To monitor the hydraulic pressure in the clutch actuator, a reference actuator can disposed in parallel with the clutch actuator and in fluid communication with the hydraulic fluid source. A compensation valve is disposed in fluid communication with and responsive to hydraulic pressure in the clutch actuator and the reference actuator. The compensation valve is further arranged to selectively direct pressurized hydraulic fluid to and from the clutch actuator in response to a relative hydraulic pressure in the clutch actuator and the reference actuator.

In another aspect, the disclosure describes a method of operating a clutch in a transmission of a work machine. To actuate the clutch, the method directs a first flow of pressurized hydraulic fluid to a clutch actuator operatively associated with the clutch. The method further directs a second flow of pressurized hydraulic fluid to a reference actuator disposed in parallel with the clutch actuator. The method then involves sensing the relative hydraulic pressure between hydraulic pressure in the clutch actuator and the reference actuator. The method then directs pressurized hydraulic fluid to and from the clutch actuator in response to the relative hydraulic pressure.

In yet a further aspect, the disclosure describes a hydraulic circuit for actuating a clutch in a transmission with a clutch actuator. The clutch actuator includes an actuator chamber and an actuator piston movably disposed in the actuator chamber to engage the clutch. The clutch actuator is disposed in fluid communication with a hydraulic fluid source supplying pressurized hydraulic fluid for the clutch actuator. A pressure control valve is disposed between and in fluid communication with the clutch actuator and the hydraulic fluid source. To regulate the hydraulic pressure in the clutch actuator, the hydraulic circuit includes an electrohydraulic valve disposed between and in fluid communication with the clutch actuator and the hydraulic fluid source. The electrohydraulic valve is configured with a feedback circuit measuring hydraulic pressure and/or flow rate proximate to an inlet of the clutch actuator to adjust the hydraulic flow to and from the clutch actuator.

DETAILED DESCRIPTION

Figure 1:
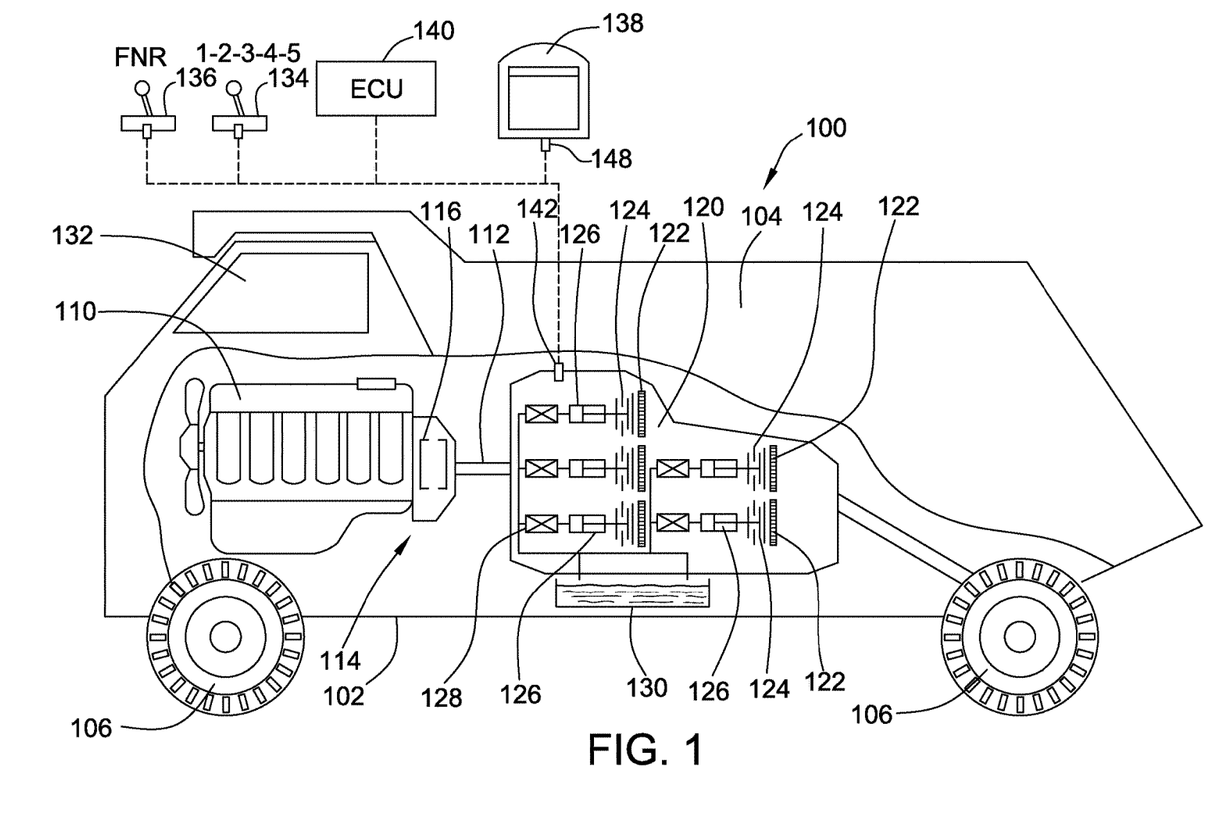
FIG. 1 is a schematic representation of a machine including a transmission having a plurality of gears and clutches that is disposed between an internal combustion engine and a driven element.

Now referring to the drawings, wherein like reference numbers refer to like elements, there is illustrated in FIG. 1 an embodiment of a work machine 100 for performing various tasks or operations about a worksite such as a construction site, a mining site, or an agricultural location. While the particular machine 100 illustrated in connection with FIG. 1 is a dump truck for transporting loose material such as gravel, earth, or dirt, the arrangement disclosed herein has universal applicability in various other types of machines as well. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

The machine 100 in the form of a dump truck can include a body or frame 102 and a dump body 104 for hauling and dumping material that may be tilted with respect to the frame. To propel the machine 100 about the worksite, the frame 102 can be supported on a plurality of wheels 106 which may include drive wheels and steer wheels that are in rolling contact with the ground; however, in other embodiments, it should be appreciated that the machine may utilize other types of propulsion devices such as continuous tracks or the like. In addition to the dump body 104 and the wheels 106, the machine 100 may be operatively associated with other suitable types of driven elements via a power takeoff for accomplishing various tasks. To provide motive power for the machine 100, the machine may include a prime mover such as an internal combustion engine 110 that can combust a hydrocarbon-based fuel and convert the chemical energy therein to rotational motion that spins a driveshaft 112 thereby generating rotational torque. The internal combustion engine 110 may be a diesel burning compression ignition engine, a gasoline burning spark ignition engine, a gas-burning turbine, hybrid engine or any other suitable power source. To transmit the rotational power from the driveshaft 112 associated with the internal combustion engine 110 to the wheels 106 and other driven elements associated with the machine 100, a drive train or powertrain 114 can be supported within the frame 102 that includes power transmitting components such as additional shafts, clutches, torque convertors, differentials, axels, and the like. For example, to selectively couple and decouple the internal combustion engine 108 with the driveshaft 112, a coupling clutch 116 can be associated with the output of the engine. The coupling clutch 116 can selectively connect and disconnect the driveshaft 112 with the crankshaft rotationally disposed in the internal combustion engine 110 so that the two components are locked in rotation together.

To modify the rotational speed and/or torque being output by the internal combustion engine 110, the powertrain 114 may also be associated with a transmission 120 disposed between the driveshaft 112 and the other driven elements including the wheels 106. The transmission 120 may be a multispeed transmission having a plurality of selectively engageable frictional elements such as a plurality of interacting gears 122. The plurality of gears 122 can be arranged in selected pairs or groups and can be engaged by intermeshing their teeth together. The diameter of the gears and the number and spacing between the teeth determines the gear ratio of a particular set of engaged gears with the different gear ratios either increasing or decreasing the rotational speed output from the internal combustion engine. The gear ratio is directly related to the speed ratio of the transmission that defines the increase or decrease in rotational speed between the driveshaft 112 and the output of the transmission. Because the speed ratio is typically calculated as input speed/output speed, at least with respect to machine speed, the speed ratio has an inverse relation to the machine speed, with a decrease in speed ratio corresponding to an increase in machine speed and an increase in speed ratio corresponding to a decrease in machine speed. The gear ratio or speed ratio can also define, in an inverse relationship, the change in output torque caused by the transmission. The transmission 120 can include any suitable number of predefined, selectable gear ratios. Further, the transmission 120 can also include a gear combination that reverses the rotational direction of the driveshaft 112 output from the internal combustion engine 110.

The transmission 120 may be a synchronous transmission wherein the gear combinations that make up the predetermined gear ratios are continuously meshed together and one or more clutches are used to bring selected gear ratios into and out of fixed engagement with rotating shafts in the transmission that couple the crankshaft and the driveshaft 112. Accordingly, in the illustrated embodiment, the plurality of gears 122 that make up the gear ratios can be operatively associated with a plurality of clutches 124. The gears 122 and associated clutches 124 may be present in the same or different ratios so that each clutch 124 may be associated with more than one gear. The plurality of clutches 124 can be hydraulic clutches that are engaged or released by controlling pressure of a hydraulic fluid supplied to the respective clutch. In particular, the clutches 124 can be formed from a plurality of adjacent plates that can be moved into and out of frictional contact with each other. When pressed adjacent to each other, the plates of the clutch 124 transmit the rotational power through the transmission 120 while when moved apart the plates are able to rotate relative to one another. To actuate the clutches 124, each clutch can be operatively associated with a clutch actuator 126 and one or more hydraulic valves 128 arranged to direct hydraulic fluid to and from the clutch actuator. A clutch actuator 126 and the hydraulic valve 128 are operatively associated with a hydraulic system or hydraulic circuit 130 disposed on the machine 100 as described in more detail below. When shifting up or down gear ratios, the hydraulic actuator 126 associated with one set of clutches 124 is pressurized to engage an unengaged gear ratio while a clutch actuator 126 associated with second set of clutches is simultaneously depressurized to disengage an engaged gear ratio. The first set may be referred to as the on-coming clutches and the second set may be referred to as the off-going clutches.

To accommodate an operator of the machine 100, an operator's station or operator's cab 132 may be disposed on the frame 102 forward of the dump body 104. The operator's cab 132 may further accommodate various controls the operator can use to direct operation of the machine 100. For example, to shift the gears 122 associated with the transmission 120 up or down, a gear shifter or gear selector 134 can be operatively associated with the powertrain 114 and the hydraulic circuit 130 to control engagement or disengagement of selected clutches 124. The gear selector 134 and relatedly the transmission 120 can have any number of engageable gears appropriate for the intended application of the machine such as, for example five different gear speeds, eight different gear speeds, or any other variation. In addition to the gear selector 134, the powertrain 114 may also be operatively associated with a forward-neutral-reverse (F-N-R) selector 136 that can decouple the internal combustion engine 108 from the rest of the powertrain 114 by, for example, releasing the coupling clutch 116. The F-N-R selector 136 can also engage and disengage specific gear ratios that reverse the rotational motion being applied to the driveshaft 110 by the internal combustion engine 108. Although in the illustrated embodiment, the gear selector 134 and F-N-R selector 136 are illustrated as levers, in other embodiments they can be other suitable controls such as buttons. In addition, to further interface with the operator of the machine 100, a human-machine interface 138 including an operator display panel such as a LCD screen or the like to display information about the machine can be included. The gear selector 134, F-N-R selector 136, and the human-machine interface 138 can be disposed in the operator station 132 with the other inputs for controlling the machine 100 such as the steering mechanism and an accelerator. However, in those embodiments in which the machine is controlled remotely, the gear selector 134, F-N-R selector 136, and the human-machine interface 138 can likewise be located off the machine.

To coordinate and control the various components in the powertrain 114, the machine 100 may include an electronic controller or computerized control module, or electronic control unit ("ECU") 140, as referred to herein. The ECU 140 may be adapted to monitor various operating parameters and to responsively regulate various variables and functions affecting the powertrain. The ECU 140 may include a microprocessor, an application specific integrated circuit (ASIC), or other appropriate circuitry and may have memory or other data storage capabilities. The ECU can include or be programmed with functions, steps, routines, control maps, data tables, charts, and the like saved in and executable from read-only memory or another electronically accessible storage medium to control the engine system. Storage or computer readable mediums may take the form of any media that provides instructions to the controller for execution. The mediums may take the form of non-volatile media, volatile media, and transmission media. Non-volatile media includes, for example, optical or magnetic disks. Volatile media includes dynamic memory. Transmission media includes coaxial cables, copper wire and fiber optics, and may also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave or any other medium from which a computer or processor may read.

Although in FIG. 1, the ECU 140 is illustrated as a single, discrete unit, in other embodiments, the ECU and its functions may be distributed among a plurality of distinct and separate components. To receive operating parameters and send control commands or instructions, the controller may be operatively associated with and may communicate with various sensors and controls in the operator station 132 and associated with the various components in the powertrain 114. Communication between the controller and the sensors and controls may be established by sending and receiving digital or analog signals across electronic communication lines or communication busses. The various communication and command channels are indicated in dashed lines for illustration purposes. To control and direct the configuration of the transmission 120, including the engagement and disengagement of specific gears 122, the ECU 140 can communicate with a transmission control 142 operatively associated with the transmission. The ECU may also measure rotational speeds input to and output from the transmission 120 via magnetic pickup sensors, optical sensors and the like. To enable operator adjustment of the transmission settings, the ECU 140 can communicate with a gear selector sensor 144 and a direction selector sensor 146 associated with the respective gear selector 134 and direction selector 136 disposed in the operator station 132. The ECU 140 can also communicate with the human-machine interface 138 via a display control 148 to interface with the operator. Command signals received from those controls can be processed by the controller and transmitted to the transmission control 142 to adjust the transmission settings accordingly.

Figure 2:
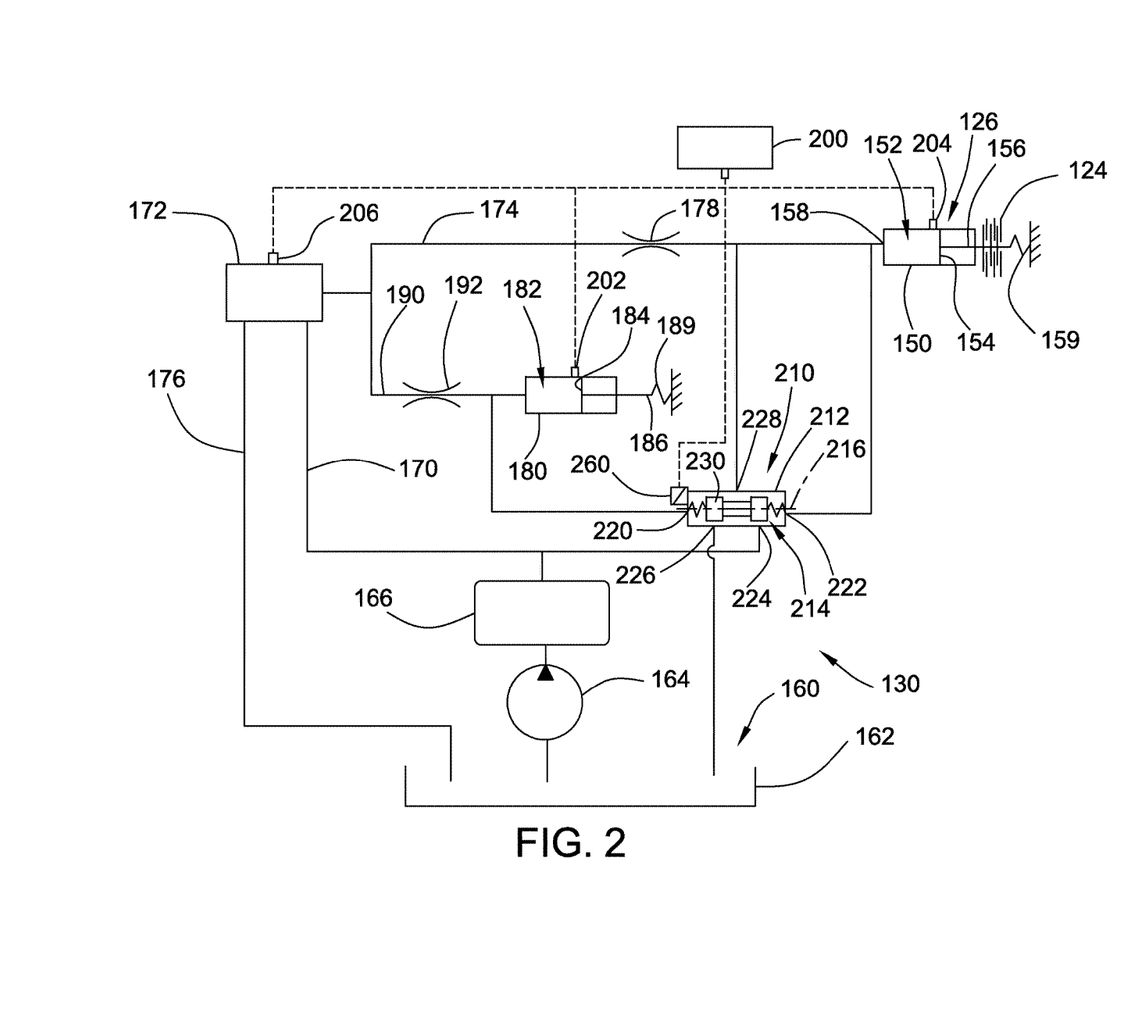
FIG. 2 is a schematic representation of a hydraulic circuit operatively associated with a clutch for engaging or disengaging a gear of the transmission including a clutch actuator, a reference actuator, and a compensation valve arranged to assist clutch actuation in accordance with the present disclosure.

Referring to FIG. 2, there is illustrated a schematic representation of the hydraulic circuit 130 for actuating the clutch 124 that may be associated with one or more gears of the transmission. To actuate the clutch 124 by moving the adjacent plates of the clutch into or out of frictional contact with one another, the clutch actuator 126 can be physically configured to urge the plates together and apart by the application of hydraulic pressure. In particular, the clutch actuator 126 can take the form of a hydraulic cylinder having a tubular cylinder body 150 delineating an actuator chamber 152 and an actuator piston 154 slidably disposed therein with a piston rod 156 that extends partially from a head end the cylinder body 150. When the actuator piston 154 reciprocally moves back and forth within the actuator chamber 152, the piston rod 156 extends and retracts from the cylinder body 150. The cylinder body 150 can further be configured with a cap end delineating an actuator inlet 158 that can be coupled to a hydraulic hose or tubing to establish fluid communication with the hydraulic circuit 130. It can be appreciated that as pressurized hydraulic fluid enters the actuator chamber 152 from the actuator inlet 158, the actuator piston 154 is moved to the right thereby urging the piston rod 156 against the plates of the clutch 124. In an embodiment, to maintain a normally disengaged configuration for the clutch 124 with the plates spaced apart, an actuator spring 159 can be disposed on the side of the clutch opposite the clutch actuator 126. The actuator spring 159 can be a helical compression spring and is connected to the piston rod 156 and arranged to urge the actuator piston 154 in the actuator chamber 152 toward the actuator inlet 158. Hence, if the hydraulic circuit 130 does not apply sufficient hydraulic pressure to the actuator inlet 158 to overcome the spring rate of the actuator spring 159, the actuator spring 159 can discharge any hydraulic fluid present in the actuator chamber 152 via displacement of the actuator piston 154. While the foregoing embodiment of the clutch actuator 126 is a single acting cylinder, in other embodiments, the clutch actuator can have other configurations such as a double acting cylinder.

To supply hydraulic fluid for actuating the clutches 124, the hydraulic circuit 130 associated with the transmission can include a hydraulic fluid source 160. To store hydraulic fluid, the hydraulic fluid source 160 may include a vented reservoir 162 designed as a refillable fluid tank and vented to atmospheric pressure. The vented reservoir 162 may be disposed at a low location relative to the arrangement of the hydraulic circuit 130 so that it may function as a sump for low pressure hydraulic fluid returning from the circuit. To pressurize and direct the hydraulic fluid in the vented reservoir 162 to the clutches 124, the hydraulic circuit 130 can include a hydraulic pump 164 disposed in fluid communication with the vented reservoir. The hydraulic pump 164 can be any suitable type of pump for pressurizing and displacing fluids including a piston pump, a vane pump, a gear pump or the like, and may have a fixed or variable displacement. In an embodiment, to temporarily store pressurized hydraulic fluid, the hydraulic circuit may further include a pressurized reservoir 166 in communication with and downstream of the hydraulic pump 164. The pressurized reservoir 166 can function as a plenum, containing the hydraulic fluid at elevated pressures, and can serve to equalize pressure fluctuations and ensures an adequate supply of hydraulic fluid for the applications associated with the hydraulic circuit. The pressurized reservoir can supply hydraulic fluid to additional clutches and applications in the hydraulic circuit.

To channel pressurized hydraulic fluid to the clutch actuator 126, the hydraulic circuit 130 can include a supply conduit or a first supply line 170 that may be in the form of flexible hosing or rigid tubing. To regulate the pressure and/or flow rate of the hydraulic fluid, the hydraulic circuit 130 can include a pressure control valve 172 disposed in the first supply line 170 between the pressurized reservoir and the clutch actuator 126. The pressure control valve 172 can be a proportional valve that varies between opening and closing positions in response to an electronic command reference to selectively establish fluid communication with the clutch actuator 126 and further can be adjustable to provide a range of varying pressures and/or flow rates to the clutch actuator. The pressure control valve 172 can modulate the hydraulic pressure to the clutch actuator 126 to actuate the clutch 124 in a controlled manner and to reduce slippage between clutch plates. A second supply line 174 can lead from the pressure control valve 172 to the clutch actuator 126. In an embodiment, when the pressure control valve 172 is closed, the pressure control valve can return hydraulic fluid to the vented reservoir 162 via a return line 176. To further regulate the flow rate of pressurized hydraulic fluid to the clutch actuator 126, an orifice or first supply restrictor 178 can be disposed in the second supply line 174 between the pressure control valve 172 and the clutch actuator. The first supply restrictor 178 may be sized in comparison to the actuator chamber 152 to regulate the fill rate and actuation timing of the clutch actuator 126.

To determine or monitor the timing and/or rate at which the clutch actuator 126 fills with hydraulic fluid, a reference actuator 180 can also be included as part of the hydraulic circuit 130 which is also disposed downstream of and configured to receive pressurized hydraulic fluid from the pressure control valve 172. The reference actuator 180 can be similar in configuration to the clutch actuator 126 and can have a tubular body delineating a hollow reference chamber 182 with a reference piston 184 slidably disposed therein. A reference piston rod 186 protrudes from the one end of the reference actuator 180 and can be connected to a reference spring 189 configured to urge the reference piston 184 into the reference chamber 182. As with the actuator spring 159, the reference spring 189 can be a helical or coil spring with a spring rate or spring constant selected to provide resistance to hydraulic fluid entering the reference actuator 180 from the pressure control valve 172. In the illustrated embodiment, the reference actuator 180 can be arranged in the hydraulic circuit 130 in parallel with respect to the clutch actuator 126. To facilitate the parallel arrangement, a third supply line 190 can branch from the second supply line 174 downstream of the pressure control valve 172. Hydraulic fluid from the pressure control valve 172 is therefore split into a first flow directed via the second supply line 174 to the clutch actuator 126 and a second flow to the reference actuator 180 via the third supply line 190. To further regulate the flow of hydraulic fluid to the reference actuator 180, a second supply restrictor 192 can be disposed in the third supply line 190 upstream of the inlet for the reference actuator. The reference actuator 180 may or may not be operatively associated with clutch plates connected to the reference piston rod 186.

Because of the parallel arrangement of the clutch actuator 126 and the reference actuator 180, both components receive pressurized hydraulic fluid in the first and second flows via the respective second and third supply lines 174, 190 at the same general hydraulic pressure from the pressure control valve 172. Accordingly, the reference actuator 180 can be used as a reference volume to monitor the hydraulic response or activity associated with the clutch actuator 126 during actuation of the clutch 124. In an embodiment, the volumetric capacity of the clutch actuator 126 and the reference actuator 180 can be proportionally scaled relative to each other so that they can receive the hydraulic fluid in relative proportional quantities and fill generally at the same predetermined rate. For example, in a possible embodiment, the clutch actuator 126 and the reference actuator 180 may have the same volumetric capacity and the actuator spring 159 and the reference spring 189 can have the same spring constant so they apply the same resistance to the influx of hydraulic fluid into the actuator chamber 152 and the reference chamber 182 respectively. However, in other embodiments, the reference actuator 180 may be proportionally smaller than the clutch actuator 126 to facilitate accommodation on the work machine. Further, the first and second supply restrictors 178 and 192 can be proportionally scaled and dimensioned with respect to each other. The clutch actuator 126 and the reference actuator 180 therefore fill with hydraulic fluid at the same rate and, if correctly configured, would fully actuate within the same time period. Therefore, measuring the fill rate and/or hydraulic characteristics of the reference actuator 180 can provide an indication of the state or condition of the clutch actuator 126.

In an embodiment, to compare the fill rates of the clutch actuator 126 and the reference actuator 180, the hydraulic circuit 130 can be operatively associated with an electronic or computerized hydraulic control unit 200. The hydraulic control unit 200 can be associated with or part of the ECU 140 described with respect to FIG. 1 and can be configured to send and receive non-transitory electronic signals via data buses or communication lines indicated in dashed line. The hydraulic control unit 200 and can be programmed to execute instructions to perform functions, routines, steps, and the like. To sense the fill rate or other parameters associated with the reference actuator 180, the hydraulic control unit 200 can be in electronic communication with a reference sensor 202 operatively associated with the reference actuator. The reference sensor 202 can measure, in particular, the displacement of the reference piston 184 with respect to the reference chamber 182, the fluid pressure of the hydraulic fluid received into the reference chamber, or any other suitable parameter associated with reference actuator 180. In addition to the reference sensor 202, the hydraulic control unit 200 can be in communication with an actuator sensor 204 operatively associated with the clutch actuator 126 to sense displacement of the actuator piston 154, fluid pressure in the actuator chamber 152, and similar information. To control the flow and pressure of the hydraulic fluid being directed to the clutch actuator 126 and the reference actuator 180, the hydraulic control unit 200 can also communicate with a control valve controller 206 operatively associated with the pressure control valve 172. The control valve controller 206 can be configured to open, close, and adjust the hydraulic flow through the pressure control valve 172. Further, the hydraulic control unit 200 can be operatively associated with any of the other components of the hydraulic circuit, such as the hydraulic pump 164 or the like.

As indicated, in an embodiment, the clutch actuator 126 and the reference actuator 180 can be configured to fill at the same rate and therefore actuate according to the same timing as determined by the hydraulic control unit 200 and/or the pressure control valve 172. However, in other embodiments, the reference actuator 180 may be used to determine if the clutch actuator 126 is experiencing late fill events or early fill events, for example, due to component wear, hydraulic leakage, mis-calibration, and similar considerations. In particular, the hydraulic control unit 200 can sense the hydraulic pressure in the clutch actuator 126 and in the reference actuator 180 to determine when they peak with respect to each other. The reference actuator 180 is designed to have a predetermined response rate with the reference chamber 182 filling with hydraulic fluid and the reference piston 184 fully compressing the reference spring 189 according to a known rate and timing. Thus, the reference actuator 180 will reach the same fluid pressure as directed by the pressure control valve 172 at a predetermined time. If the clutch actuator 126 is experiencing an early fill event, its fluid pressure will peak prior to the measured pressure in the reference actuator 180. Likewise, if the clutch actuator 126 is experiencing a late fill event, its measured pressure will peak after the fluid pressure associated with the reference actuator 180. Accordingly, the hydraulic control unit 200 can monitor hydraulic actuation of the clutch actuator 126 with reference to the predetermined operation of the reference actuator 180.

Figure 3:
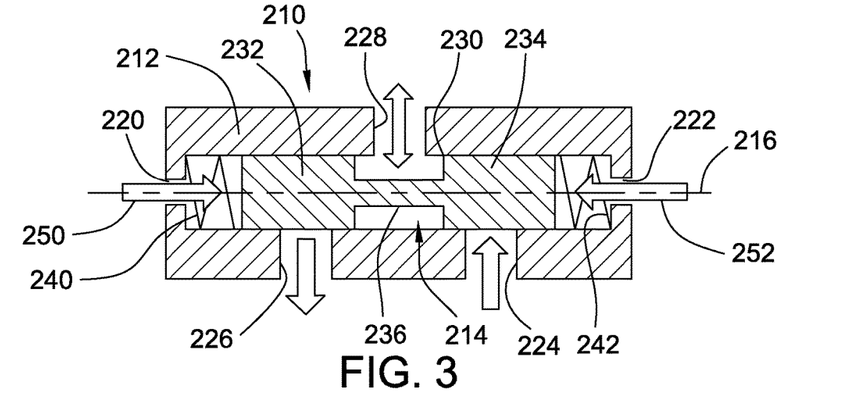
FIG. 3 is a schematic illustration of an embodiment of the compensation valve with a spool disposed in a typical position when the fill rates of the clutch actuator and the hydraulic actuator are generally equal.

In a further embodiment, to correct for early and/or late fill events, the hydraulic circuit 130 can also include a compensation valve 210 disposed in fluid communication with and responsive to both the clutch actuator 126 and the reference actuator 180. Referring to FIG. 3, in the illustrated embodiment, the compensation valve 210 can be a mechanical spool valve having an elongated, hollow, tubular valve body 212 delineating a cylindrical internal bore 214 that extends along an axis line 216. The valve body 212 can be made from cast or machined metal or the like. To connect the compensation valve 210 with the rest of the hydraulic circuit 130, the valve body 212 can include a plurality of ports disposed through it into the internal bore 214. In particular, the valve body 212 can include first side port 220 disposed at a first axial end and an oppositely located second side port 222 disposed at the second axial end. The first and second side ports 220, 222 can be axially aligned with the axis line 216 extending along the internal bore 214. The first side port 220 can be arranged in fluid communication with the reference actuator 180 by connecting with the third supply line 190 proximate the inlet of the reference actuator. Accordingly, the first side port 220 is maintained at the same hydraulic pressure as the reference actuator 180 is experiencing. The second side port 222 is disposed in fluid communication with the clutch actuator 126 and experiences the same hydraulic pressure as present in the clutch actuator. The compensation valve 210 can also include a various ports radially disposed into the valve body 212 including a supply port 224 communicating with the pressurized reservoir 166 to receive pressurize hydraulic fluid, a relief port 226 communicating with the vented reservoir 162, and an clutch actuator port 228 that communicates with the clutch actuator 126. Specifically, the clutch actuator port 228 connects with the second supply line 174 downstream of the first supply restrictor 178 so that it can provide direct fluid communication with the actuator chamber 152 of the clutch actuator 126.

To selectively open and close the ports disposed on the valve body 212 and establish fluid communication through the body, the compensation valve 210 can include an internally disposed spool 230 that is reciprocally slidable along the internal bore 214 with respect to the axis line 216. As illustrated in FIG. 3, the spool 230 can be a barbell shaped structure including a first land 232 and a second land 234 that are joined by a narrow neck 236. When disposed in the valve body 212, the first and second lands 232, 234 and the neck 236 align with the axis line 216. The spool 230 can also be shorter than the valve body 212 so that it can axially slide with respect to the internal bore 214 between the first side port 220 and the second side port 222. To maintain the spool 230 at a centrally disposed position with respect to the valve body 212, a first axial spring 240 and a second axial spring 242 can be disposed in the internal bore 214 adjacent to either side of the spool. The first and second axial springs 240, 242 can be helical coil springs that urge the spool 230 away from the first and second side ports 220, 222 toward the central portion of the valve structure.

The central position of spool 230 illustrated in FIG. 3 can be the typical position for the spool if the hydraulic pressure present in the clutch actuator and in the reference actuator are substantially equal. In particular, with reference to FIGS. 2 and 3, the hydraulic circuit 130 subjects the first side port 220 to the hydraulic reference pressure 250 present at the reference actuator 180 while the second side port 222 receives the clutch actuator pressure 252 present at the clutch actuator 126. The compensation valve 210 is thus subject to the relative hydraulic pressure between the clutch actuator 126 and the reference actuator 180. If both actuators 126, 180 are receiving hydraulic fluid from the pressure control valve 172 at substantially the same pressure and flow rate, the application of the same reference pressure 250 and the clutch actuator pressure 252 to the compensation valve 210 tends to cancel. The spool 230 maintains the centrally disposed position between the first side port 220 and the second side port 222 because it does not experience a difference in the relative hydraulic pressure between the actuators. Additionally, the first land 232 and the second land 234 are positioned to block the radially disposed supply port 224 and relief port 226. Accordingly, hydraulic fluid is unable to flow through the compensation valve 210 in either direction.

Figure 4:
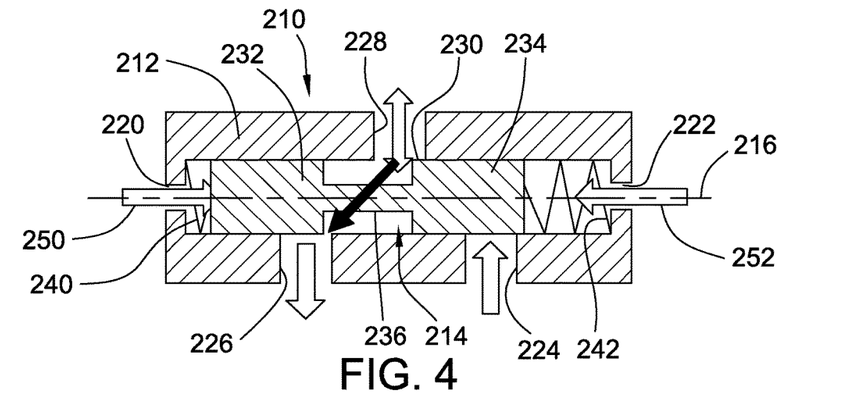
FIG. 4 is a schematic illustration of the embodiment of the compensation valve with a spool disposed in a position assumed during an early fill event.

Referring to FIGS. 2 and 4, however, if the clutch actuator pressure 252 exceeds the reference pressure 250, as would occur during an early fill event with the clutch actuator 126, the relative hydraulic pressure will displace the spool 230 toward the first side port 220 and away from the second side port 222. The first land 232 may unseal the relief port 226 establishing fluid communication across the valve body 212 with the clutch actuator port 228. The second land 234 remains positioned covering the supply port 224. This allows a portion of the pressurized hydraulic fluid present at the clutch actuator 126 to flow through the compensation valve 210 to the vented reservoir 162, thereby reducing the fill rate and pressure at the clutch actuator 126. Actuation of the clutch actuator 126 is thereby delayed and the hydraulic circuit 130 can correct for the early fill event.

Figure 5:
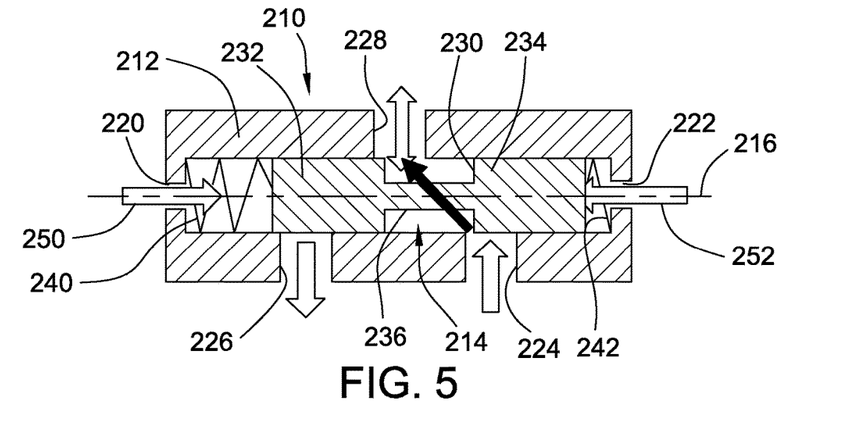
FIG. 5 is a schematic illustration of the embodiment of the compensation valve with the spool disposed in a position assumed during a late fill event.

Referring to FIGS. 2 and 5, if the clutch actuator pressure 252 is less than the reference pressure 250 after a predetermined time, as would occur during a late fill event, the relative hydraulic pressure displaces the spool 230 away from the first side port 220 and toward the second side port 222. Displacement of the spool 230 moves the second land 234 to unseal the supply port 224 and establish fluid communication between the pressurized reservoir 166 and the clutch actuator 126 through the clutch actuator port 228. The first land 232 continues to seal the relief port 226 to the vented reservoir 162. The compensation valve 210 therefore directs pressurized hydraulic fluid to the clutch actuator 126 to compensate for the late fill event. If the reference pressure 250 and the clutch actuator pressure 252 equalize again, the first and second axial springs 240, 242 can move the spool 230 back to the centrally disposed position illustrated in FIG. 3 so that hydraulic fluid is unable to flow across the compensation valve 210.

Referring back to FIG. 2, in an embodiment, the hydraulic circuit 130 can also be configured with features to accommodate a hydraulic circuit error such as a malfunction or failure of the pressure control valve 172 to properly direct pressurized hydraulic fluid to the clutch actuator 126. In such an embodiment, the compensation valve 210 can reroute pressurized hydraulic fluid from the pressurized reservoir 166 directly to the actuator chamber 152 of the clutch actuator 126 by bypassing the pressure control valve 172. To facilitate this action, the compensation valve 210 is operatively associated with an electromechanical actuator 260 such as a solenoid having a reciprocal plunger that is in electronic communication with the hydraulic control unit 200. If the hydraulic control unit 200 senses a failure with the pressure control valve 172 to deliver the required hydraulic pressure or senses another hydraulic circuit error, the hydraulic control unit can actuate the electromechanical actuator 260. The electromechanical actuator 260 further can be disposed on the valve body 212 so that, when actuated, the plunger urges the spool 230 toward the second side port 222 establishing fluid communication between the supply port 224 and the clutch actuator port 228. Accordingly, the compensation valve 210 directs pressurized hydraulic fluid to fill the actuator chamber 152, actuating the clutch 124 and engaging the associated gears of the transmission. The work machine therefore includes a "limp home mode" in which the transmission remains engaged and the machine has limited functionality until appropriate maintenance can be performed.

Figure 6:
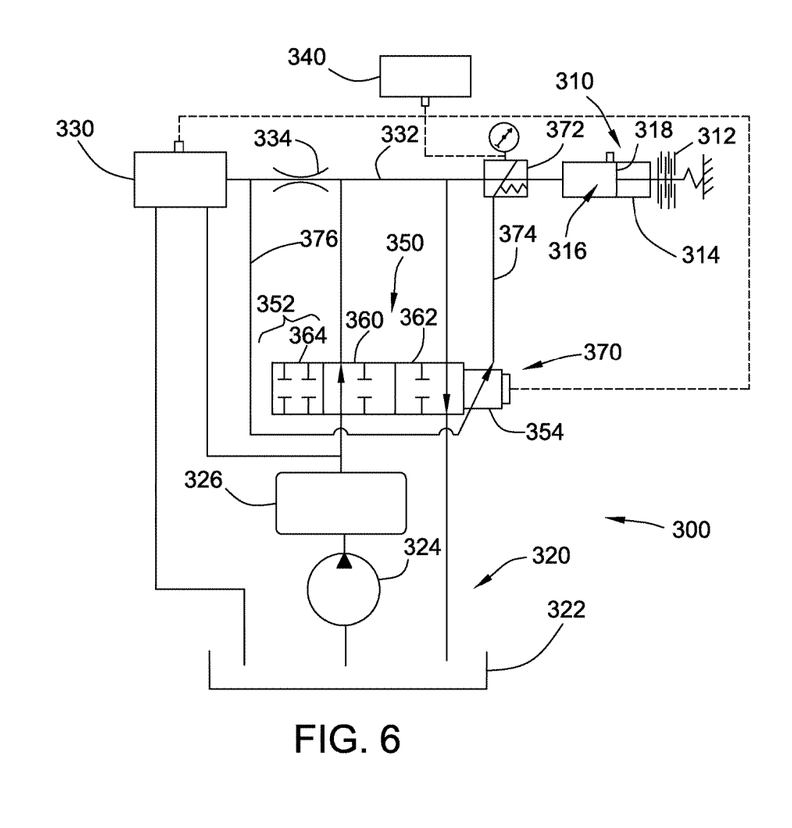
FIG. 6 is a schematic representation of an alternative embodiment of the hydraulic circuit operatively associated with the clutch utilizing a pressure sensor and an electrohydraulic valve arranged to assist clutch actuation in accordance with the present disclosure.

Referring to FIG. 6, there is illustrated an alternative embodiment of the hydraulic circuit 300 in which the functionality of the reference actuator and the compensator valve are combined and replaced with an electrohydraulic valve utilizing feedback from the circuit to compensate for early or late fill events. In the illustrated embodiment, to shift gears in a transmission operatively associated with the hydraulic circuit 300, the circuit includes a hydraulic actuated clutch actuator 310 coupled to a clutch 312 that may have a plurality of adjacent, rotating frictional coupling elements that engage and disengage the gears. The clutch actuator 310 can be configured as a hydraulic cylinder with a cylinder body 314 delineating an internal actuator chamber 316 with an actuator piston 318 movably disposed therein to urge the clutch 312 into and out of frictional engagement. To supply pressurized hydraulic fluid to actuate the clutch actuator 310, the hydraulic circuit 300 includes a hydraulic fluid source 320 for pressurizing and channeling hydraulic fluid. The hydraulic fluid source 320 may include a vented reservoir 322 vented to atmospheric pressure for accommodating the fluid. The vented reservoir 322 is in fluid communication with a hydraulic pump 324 that pressurizes the hydraulic fluid and directs it to a pressurized reservoir 326 for temporary storage and use with the hydraulic circuit 300. To selectively direct the pressurized hydraulic fluid to the clutch actuator 310, the hydraulic circuit 300 includes a pressure control valve 330 disposed between and in fluid communication with the pressurized reservoir 326 and the clutch actuator 310. The pressure control valve 330 can again be configured to selectively adjust the pressure and/or flow rate of hydraulic fluid to the clutch actuator 310. The pressure control valve 330 can direct hydraulic fluid into the actuator chamber 316 via another supply line 332 that may have additional hydraulic components disposed in it such as a supply restrictor 334.

To regulate the hydraulic circuit 300, a hydraulic control unit 340 is operatively associated with the circuit and which may be part of or associated with the ECU 140 described with respect to FIG. 1. The hydraulic control unit 340 can include electronic or computerized functionality to measure various parameters and variables regarding the hydraulic circuit 300 and to execute instructions or routines to responsively adjust operation of the hydraulic circuit. For example, the hydraulic control unit 340 may be in electronic communication with the pressure control valve 330 to selectively open, close, or adjust the valve settings to control the pressure and/or flow rate of hydraulic fluid to the clutch actuator 310. The hydraulic control unit 340 can communicate with the other components disposed in the hydraulic circuit 300.

To replace the reference accumulator and the compensation valve, the electrohydraulic valve 350 can be disposed in fluid communication with fluid source 320 of the hydraulic circuit 300 and can include a main stage 352 for selectively directing fluid to and from the fluid source and a pilot stage 354 for actuating the main stage. In an embodiment, the main stage 352 includes a first position 360 configured and ported to direct pressurized hydraulic fluid from the pressurized reservoir 326 to the supply line 332 upstream of the clutch actuator 310 by bypassing the pressure control valve 330. The main stage 352 also includes a second position 362 that is configured to direct pressurized hydraulic fluid from the supply line 332 to the vented reservoir 322, thereby redirecting a portion of the hydraulic flow from the pressure control valve 330. The main stage may also include a third position 364 in which fluid is unable to flow in either direction through the electrohydraulic valve 350.

To selectively switch between the first, second, and third positions 360, 362, 364 of the main stage 352, the pilot stage 354 can be operatively associated with a feedback circuit 370 that compares hydraulic pressure entering the clutch actuator 310 with pressure in other portions of the hydraulic circuit 300. In particular, the feedback circuit 370 includes a pressure sensor 372 operatively disposed in the supply line 332 proximate to the inlet to the clutch actuator 310. The pressure sensor 372 is configured to measure the hydraulic pressure and/or flow rate of the hydraulic fluid entering the actuator chamber 316. The pressure sensor 372 is further configured to communicate the measured information to the pilot stage 254 of the electrohydraulic valve 350 by electronic or other signaling methods via a first feedback line 374. To sense the hydraulic pressure and/or flow rate exiting the pressure control valve 330, the pilot stage 354 also communicates with, measures, or receives hydraulic fluid upstream of the supply restrictor 334 via a second feedback line 376. By comparing the pressures and information from the different locations, the pilot stage 354 can assess whether the clutch actuator 310 is experiencing an early fill or late fill event. The pilot stage 354 can further react by shifting the main stage 352 to actuate the first position 360 to provide additional hydraulic flow to the clutch actuator 310 or actuating the second position 362 to redirect hydraulic flow from the clutch actuator. The third position 364 may function as the default or normal position for the electrohydraulic valve when the filling rate of the clutch actuator 310 is acceptable.

INDUSTRIAL APPLICABILITY

With reference to FIG. 2, the disclosed arrangement of the clutch actuator 126, the reference actuator 180, and the compensation valve 210 can work in cooperation to assist actuation of a clutch 124, whether it is an oncoming or off-going clutch, in particular by correcting for early fill or late fill events that may occur with the clutch actuator 126. Because of the parallel layout of the clutch actuator 126 and the reference actuator 180, both components receive proportional quantities of the hydraulic flow from the pressure control valve 172 by way of the respective second and third supply lines 174, 190. If the clutch actuator 126 experiences an early fill event, as compared to the predetermined fill rate and pressure associated with the reference actuator 180, the compensation valve 210 can respond by displacing the spool 230 to the position illustrated in FIG. 4. The compensation valve 210 can thereafter redirect a portion of the hydraulic flow from the second supply line 174 to the vented reservoir 162. By redirecting hydraulic flow from the clutch actuator 126, the compensation valve 210 also relatedly reduces the fill rate of the actuator chamber 152 and may dissipate pressure spikes that could otherwise result from an early fill event. If the clutch actuator 126 experiences a late fill event compared to the predetermined fill rate and timing associated with the reference actuator 180, the compensation valve 210 responds by establishing fluid communication directly between the pressurized reservoir 166 and the second supply line 174 just upstream of the actuator inlet 158. Repositioning the spool 230 to the position illustrated in FIG. 5 accomplishes the aforementioned communication so the compensation valve 210 directs additional pressurized hydraulic fluid to the clutch actuator 126 to increase the fill rate.

The embodiment of the hydraulic circuit illustrated in FIG. 2 utilizes the reference actuator 180 and compensation valve 210 to self-regulate the hydraulic flow to the clutch actuator 126 by monitoring hydraulic pressure at different points in the hydraulic circuit, in a manner providing a self-correcting feedback loop. The embodiment illustrated in FIG. 6 likewise utilizes an electrohydraulic valve 350 with a feedback circuit 370 to adjust hydraulic pressure to the clutch actuator 310 and compensate for early fill and late fill events.

Hence, the addition of the reference actuator 180 and the compensation valve 210 in FIG. 1, or the electrohydraulic valve 350 in FIG. 6, add a compensation function by bypassing the pressure control valve 172 to selectively establish fluid communication between the clutch actuator 126 and the hydraulic fluid source 160 when necessary to improve clutch engagement and performance. A possible advantage of the disclosure is the hydraulic circuits are more tolerant to variations or changes in the hydraulic capacities of the clutch actuator 126. Variations caused by dimensional tolerances, fluid leakage, component wear or other reasons can be compensated by cooperation of the reference actuator 180 and the compensation valve 210, or by the electrohydraulic valve, in response to pressure comparisons between the reference and clutch actuators. These and other advantages of the disclosure will be apparent from the foregoing description and the accompanying drawings.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A hydraulic circuit for a transmission including at least one clutch, the hydraulic circuit comprising:
   a hydraulic fluid source supplying pressurized hydraulic fluid;
   a clutch actuator operatively associated with a clutch, the clutch actuator including an actuator chamber and an actuator piston movably disposed in the actuator chamber, the clutch actuator in fluid communication with the hydraulic fluid source;
   a reference actuator disposed in parallel to the clutch actuator and in fluid communication with the hydraulic fluid source; and
   a compensation valve disposed in fluid communication with and responsive to hydraulic pressure in the clutch actuator and the reference actuator, the compensation valve arranged to selectively direct pressurized hydraulic fluid to and from the clutch actuator in response to a relative hydraulic pressure between the clutch actuator and the reference actuator.

2. The hydraulic circuit of claim 1, wherein the compensation valve is a spool valve having a spool movably disposed in a valve body in response to the relative hydraulic pressure from the clutch actuator and the reference actuator.

3. The hydraulic circuit of claim 2, wherein the compensation valve includes a supply port, a relief port, and an actuator port, each disposed into the valve body.

4. The hydraulic circuit of claim 3, wherein the hydraulic fluid source includes a pressurized reservoir storing pressurized hydraulic fluid and a vented reservoir for fluid return from the hydraulic circuit.

5. The hydraulic circuit of claim 4, wherein the supply port is in fluid communication with the pressurized reservoir and the relief port is in fluid communication with the vented reservoir.

6. The hydraulic circuit of claim 5, further comprising an electromechanical actuator operatively associated with the compensation valve and configured to direct pressurized hydraulic fluid to the clutch actuator during a hydraulic circuit error.

7. The hydraulic circuit of claim 2, wherein the compensation valve includes a first side port communicating with the reference actuator to receive a hydraulic reference pressure and a second side port communicating with the clutch actuator to receive a clutch actuator pressure, the first and second side ports dispose on opposites sides of the valve body.

8. The hydraulic circuit of claim 1, wherein the reference actuator is volumetrically proportional to the clutch actuator to fill at a same rate.

9. The hydraulic circuit of claim 8, wherein the reference actuator includes a reference chamber and a reference piston movably disposed in the reference chamber.

10. The hydraulic circuit of claim 1, further comprising a first supply restrictor disposed in fluid communication with the clutch actuator and a second supply restrictor disposed in fluid communication with the reference actuator, the first supply restrictor and the second supply restrictor controlling flow rates of pressurized hydraulic fluid from the hydraulic fluid source to the clutch actuator and the reference actuator respectively.

11. The hydraulic circuit of claim 1, further comprising a pressure control valve in fluid communication with and downstream of the hydraulic fluid source, the pressure control valve in fluid communication with and upstream of the clutch actuator and the reference actuator.

12. The hydraulic circuit of claim 11, further comprising a hydraulic control unit in electronic communication with the pressure control valve and directing non-transitory control signals to the pressure control valve to engage and disengage the clutch.

* * * * *